United States Patent [19]
Osman

[11] Patent Number: 5,362,817
[45] Date of Patent: Nov. 8, 1994

[54] POLYISOBUTYLENE BASED BLOCK COPOLYMERS

[75] Inventor: Akhtar Osman, Sarnia, Canada

[73] Assignee: Polysar Rubber Corporation, Sarnia, Canada

[21] Appl. No.: 108,862

[22] Filed: Aug. 18, 1993

Related U.S. Application Data

[62] Division of Ser. No. 686,553, Apr. 17, 1991, Pat. No. 5,260,383.

[51] Int. Cl.$^5$ .............................................. C08F 8/22
[52] U.S. Cl. .............................. 525/334.1; 525/356; 525/357; 525/358
[58] Field of Search ...................... 525/334.1, 356, 357, 525/358

[56] References Cited

U.S. PATENT DOCUMENTS

| | | | |
|---|---|---|---|
| 3,374,786 | 5/1973 | Walden et al. | |
| 4,316,973 | 2/1982 | Kennedy | 525/335 |
| 4,650,832 | 3/1987 | Kowalski et al. | 525/344.1 |
| 4,703,091 | 10/1987 | Gardner et al. | 525/357 |
| 4,725,506 | 2/1988 | Nagano | 525/334.1 |
| 4,879,353 | 11/1989 | Sanders et al. | 525/357 |
| 4,908,421 | 3/1990 | Mishra et al. | 526/147 |
| 4,910,261 | 3/1990 | Kaszas et al. | 525/314 |
| 4,910,321 | 3/1990 | Kennedy et al. | 549/213 |
| 4,929,683 | 5/1990 | Kennedy et al. | 525/268 |
| 4,943,616 | 7/1990 | Mishra et al. | 525/264 |
| 4,946,899 | 8/1990 | Kennedy et al. | 525/244 |
| 4,975,496 | 12/1990 | Tigner et al. | 525/357 |
| 5,087,674 | 2/1992 | Gardner et al. | 525/334.1 |
| 5,122,573 | 6/1993 | Knoll et al. | 525/334.1 |

*Primary Examiner*—John Kight, III
*Assistant Examiner*—John M. Cooney, Jr.
*Attorney, Agent, or Firm*—Joseph C. Gil; Godfried R. Akorli

[57] ABSTRACT

A process for preparing linear block and three arm star block copolymers having blocks of polyisobutylene and blocks of anionically polymerizable monomers comprises mixing a first solution of a polyisobutylene having a number average molecular weight of from about 4,000 to about 60,000 and having from 1 to 3 terminal allylic halogens with a second solution of a living alkali metal terminated polymer having a number average molecular weight of from about 4,000 to about 60,000 in relative proportions at a temperature of from about 10° C. to about 80° C. for a period of time of from about 30 minutes to about 24 hours whereby a significant amount of linear block or three arm star block copolymer is formed. A polyisobutylene having from 1 to 3 terminal allylic halogens is provided and a process for preparing said polyisobutylene.

12 Claims, No Drawings

POLYISOBUTYLENE BASED BLOCK COPOLYMERS

This application is a division of application Ser. No. 07/686,553 filed April 17, 1991 now U.S. Pat. No. 5,260,383.

FIELD OF INVENTION

This invention relates to linear block and star block copolymers of polyisobutylene and polymers of anionically polymerizable monomers. More particularly this invention relates to a process for the preparation of block copolymers having blocks of polyisobutylene and blocks of polymers of anionically polymerizable monomers through the reaction of a polyisobutylene having from one to three terminal reactive moieties with living polymers prepared by the anionic polymerization of appropriate monomers. The linear block or three arm star block copolymer product produced in this manner is either elastomeric in character or exhibits both elastomeric and thermoplastic properties depending upon the nature of the living polymer.

1. Background of the Invention

Terminally functional polymers of isobutylene are of great interest in that they may serve as precursors to the production of block copolymers having blocks of polyisobutylene and blocks of a variety of polymers of anionically polymerizable monomers. Block copolymers of polyisobutylene and polybutadiene are of interest because they represent a way in which incompatible butyl rubber and polybutadiene may be compatibilized and advantage thereby taken of butyl rubber's unique properties in formulating compounds for tire tread applications. Block copolymers of polyisobutylene with polystyrene, poly-alphamethylstyrene or styrene-indene copolymers are of interest because they exhibit both elastomeric as well as thermoplastic characteristics, behaving like vulcanized rubbers at room temperature, and like thermoplastic polymers at higher temperatures. Thus, such materials can be melt extruded like plastics while retaining their beneficial rubbery features upon cooling. Block copolymers of polyisobutylene and polymers of acrylate monomers are of interest because they provide a means of toughening or improving the impact resistance of acrylate thermoplastics. Thus, it would be advantageous to develop a polyisobutylene with a terminal functionality that is appropriate for the production of block copolymers of polyisobutylene with polymers of anionically polymerizable monomers. Such a terminal functionality is an allylic halogen which will readily undergo a nucleophilic substitution reaction with an anion and in particular, a living polymer anion.

2. Description of the Prior Art

U.S. Pat. No. 3,374,786 (Walden et al) discloses a crosslinkable composition of matter consisting of a polyisobutylene terminated with a carboxy, hydroxy or epoxy functional group and a polybutadiene terminated with the same functional group as said functionally terminated polyisobutylene, a crosslinking agent for said terminal functional groups and a particulate inorganic oxidizing agent.

U.S. Pat. No. 4,316,973 (Kennedy) discloses that a polymer having at least two terminal unsaturations is formed from an inifer and a cationically polymerizable olefin monomer having from about 4 to about 12 carbon atoms, the inifer having the general formula $AY_n$ where A can be an aromatic moiety or an aliphatic moiety such as a linear or branched chain having from 3 to about 20 carbon atoms and the Y component is represented by the formula

wherein R and $R^1$ can be hydrogen, methyl or phenyl and R and $R^1$ can be the same when A is an aromatic moiety and one of R and $R^1$ must be phenyl when A is an aliphatic moiety and X is F, Cl of Br and n is an integer from 2 to 6.

U.S. Pat. No. 4,908,421 (Mishra et al) discloses a living carbocationic polymerization process for producing a polyisobutylene having tertiary halogen termini that comprises introducing isobutylene, an organic peroxy compound and a Lewis acid into a suitable reaction vessel and polymerizing the isobutylene at a temperature of from about −80° C. to about 0° C., the organic peroxy compound being selected from the group consisting of organic peroxides and hydroperoxides, peroxy carbonates, azo peroxy compounds and peroxy esters.

U.S Pat. No. 4,910,261 (Kaszas et al) discloses a triblock copolymer consisting of a polyisobutylene midblock with a weight average molecular weight to number average molecular weight of 1.5 or less and polymerized diene end blocks, segments of which may be partially cyclized.

U.S. Pat. No. 4,910,321 (Kennedy et al) discloses that tertiary chlorine terminated polyisobutylenes may be produced by using an initiating system comprising an organic carboxylic acid or ester initiator and a Lewis acid for the living carbocatic polymerization of isobutylene.

U.S. Pat. No. 4,929,683 (Kennedy et al) discloses that polyisobutylenes carrying tertiary halogen termini may be prepared by the living carbocationic polymerization of isobutylene employing an initiating system that is based on an organic tertiary ester initiator used in conjunction with a Lewis acid.

U.S. Pat. No. 4,943,616 (Mishra et al) discloses a polymerization process for producing block copolymers of polyisobutylene and polymerized diolefin monomers or polymerized vinylidene aromatic monomers that comprises introducing a monomer charge, a Lewis acid and an organic peroxy compound into a suitable reaction vessel and polymerizing the monomer charge at a temperature of from about −80° C. to about 0° C. to form the block copolymer wherein the monomer charge comprises the sequential addition of isobutylene and diolefin or vinylidene aromatic monomers and the organic peroxy compound is charged in an amount of from about $10^{-4}$ to about $10^{-1}$ moles per mole of the isobutylene.

U.S. Pat. No. 4,946,899 (Kennedy et al) discloses a process for preparing linear or star-shaped block copolymers of isobutylene and at least one of styrene, halo and alkyl styrenes, indene and alkylated indenes which comprises polymerizing at a temperature of about −10° C. to 90° C. said isobutylene in an anhydrous system comprising an initiator having the formula

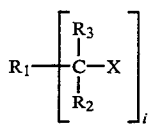

in which $R_1$, $R_2$ and $R_3$ are alkyl, aryl or aralkyl groups and can be the same or different and X is a carboxyl, alkoxyl, hydroxyl or halogen group, and i is a positive whole number, a metal halide selected from the metal halides of tin, titanium, aluminum, boron and a mixed solvent formed of at least one hydrocarbon or halohydrocarbon and an electron pair donor solvent of 15 to 50 donor number when X is hydroxyl or halogen, and after polymerizing said isobutylene to form a living polymer adding an electron pair donor solvent of 15 to 50 donor number to said system followed by the addition of at least one of styrene, halo and alkyl styrenes, indene and alkylated indenes and polymerizing said monomer to form a linear or star-shaped block copolymer.

SUMMARY OF THE INVENTION

It is an objective of this invention to provide a process for producing linear block and three arm star block copolymers having blocks of polyisobutylene and blocks polymers of anionically polymerizable monomers by reaction of a polyisobutylene having from one to three terminal allylic halogen functionalities with living polymers.

It is a further objective of this invention to provide a novel polyisobutylene having from one to three terminal allylic halogen functionalities.

It is yet another objective of the present invention to provide a process for the synthesis of a novel polyisobutylene having from one to three terminal allylic halogen functionalities.

Accordingly, in one of its aspects the present invention provides a process for preparing linear block and three arm star block copolymers having blocks of polyisobutylene and blocks of polymers of anionically polymerizable monomers which process comprises:

i) providing a first solution in an inert organic solvent of polyisobutylene having a number average molecular weight of from about 4,000 to about 60,000 and having from 1 to 3 terminal allylic halogens wherein said halogen is selected from the group consisting of chlorine and bromine, the amount of polyisobutylene in said solution being from about 1 to about 10 parts by weight per 100 parts by weight of inert organic solvent;

ii) providing in an inert organic solvent which may or may not be the inert organic solvent of step (i), a second solution compatible with said first solution of a living alkali metal terminated polymer having a number average molecular weight of from about 4,000 to about 60,000, the amount of said living polymer in said second solution being of from about 1 to about 15 parts by weight per 100 parts by weight of inert organic solvent and said living polymer having been prepared by anionic polymerization of a monomer selected from the group consisting of conjugated diolefins, vinyl aromatic monomers, acrylates and mixtures thereof, iii) mixing at a temperature of from about 10° C. to about 80° C. for a period of time of from about 30 minutes to about 24 hours said first solution of polyisobutylene with said second solution of a living polymer in relative proportions whereby a significant amount of linear block or three arm star-block copolymer is formed, and iv) recovering from the solution the product of step (iii).

In another of its aspects the present invention provides a polyisobutylene having from 1 to 3 terminal allylic halogens wherein said halogen is selected from the group consisting of chlorine and bromine.

In yet another of its aspects the present invention provides a process for preparing a polyisobutylene having from 1 to 3 terminal allylic chlorines which comprises the steps of:

i) forming a solution of a polyisobutylene having from 1 to 3 terminal unsaturations in an inert organic solvent wherein there is dispersed from 0 to about 10 percent by volume of water per volume of inert organic solvent, ii) adding to said polyisobutylene solution molecular chlorine in a quantity sufficient to achieve the desired level of chlorination at a temperature of from about 0° C. to about 50° C. for a reaction time of from about 2 to about 15 minutes in the absence or near absence of light whereby said polyisobutylene having from 1 to 3 terminal unsaturations becomes chlorinated in the allylic position, iii) adding an alkaline solution to the solution from (ii) sufficient to neutralize the hydrogen chloride formed, and iv) recovering from the solution the polyisobutylene having from 1 to 3 terminal allylic chlorines.

An additional aspect of the present invention is the provision of a process for preparing a polyisobutylene having from 1 to 3 terminal allylic halogens wherein said halogen is selected from the group consisting of chlorine and bromine which process comprises the steps of:

i) forming a solution of a polyisobutylene having from 1 to 3 terminal unsaturations in an inert organic solvent, ii) adding to said polyisobutylene solution a halogenating agent selected from the group of N-chloroamides and N-bromoamides in a quantity sufficient to achieve the desired level of halogenation, iii) subjecting the resulting solution to a temperature of from about 15° C. to about 35° C. in the absence or near absence of light whereby said polyisobutylene having from 1 to 3 terminal unsaturations becomes halogenated in the allylic position, and iv) recovering from the solution the polyisobutylene having from 1 to 3 terminal allylic halogens wherein said halogen is selected from the group consisting of chlorine and bromine.

DETAILED DESCRIPTION OF THE INVENTION

The present invention provides a process for the production of linear and three arm star block copolymers of polyisobutylene and polymers of anionically polymerizable monomers. The development of this process has arisen as a result of the discovery of a means whereby a novel polyisobutylene having from 1 to 3 terminal allylic halogens may be synthesized. This polyisobutylene bearing the highly reactive allylic halogen moiety then readily undergoes reaction with living polymers to yield the aforesaid block copolymers.

Synthesis of the polyisobutylene bearing from 1 to 3 terminal allylic halogens is accomplished via a three step procedure involving the synthesis of a polyisobutylene having from 1 to 3 tertiary halogen termini which upon dehydrohalogenation yields a polyisobutylene having terminal unsaturation that may then be halogenated to afford the aforementioned polyisobutylene having from 1 to 3 terminal allylic halogens.

Polyisobutylenes having tertiary halogen termini may be prepared by the carbocationic polymerization of isobutylene using a variety of initiators in conjunction with a Lewis acid.

In U.S. Pat. No. 4,316,973 Kennedy has disclosed that an initiator with the general formula $AY_n$ together with a Lewis acid can be utilized for the synthesis of tertiary halogen terminated polyisobutylene. The A component of the initiator can be an aromatic moiety or an aliphatic moiety such as a linear or branched chain having from 3 to about 20 carbon atoms and the Y component is represented by the formula

wherein R and $R^1$ can be hydrogen, methyl or phenyl and R and $R^1$ can be the same when A is an aromatic moiety and one of R and $R^1$ must be phenyl when A is an aliphatic moiety and X is F, Cl or Br, and n is an integer from 2 to 6.

In U.S. Pat. No. 4,929,683 Kennedy et al have disclosed that polyisobutylenes carrying tertiary halogen termini may also be prepared by the living carbocationic polymerization of isobutylene employing an initiating system that is based on a tertiary organic ether initiator used in conjunction with a Lewis acid.

Kennedy et al have further disclosed in U.S. Pat. No. 4,910,321 that tertiary chlorine terminated polyisobutylenes may also be produced by using an initiating system comprising an organic carboxylic acid or ester initiator and a Lewis acid for the living carbocationic polymerization of isobutylene.

In U.S. Pat. No. 4,908,421, yet another process for producing a polyisobutylene carrying tertiary halogen termini by the living carbocationic polymerization of isobutylene is disclosed. The process comprises introducing isobutylene, an organic peroxy compound and a Lewis acid into a suitable reaction vessel and polymerizing the isobutylene at a temperature of from about $-80°$ C. to about $0°$ C. The organic peroxy compound suitable for use in the process is selected from the group comprising organic peroxides and hydroperoxides, peroxy carbonates, azo peroxy compounds and peroxy esters; the preferred organic peroxy compound being selected from the group consisting of t-butyl hydroperoxide, cumene hydroperoxide, p-dicumyl hydroperoxide, triphenyl methyl hydroperoxide and 2,5-dimethyl-2,5-bis(benzyl peroxyhexane).

In U.S. Pat. No. 4,943,616 it is further disclosed that when the aforementioned process further comprises the addition of an electron donor that has an electron donor number of at least about 22 to no more than about 50 a polyisobutylene carrying tertiary halogen termini and having a ratio of weight average molecular weight to number average molecular weight of no more than about 1.6 may be produced. Little advantage is gained, however, in using an electron donor in the process when the organic peroxy compound is selected from the group consisting of peroxy esters and peroxy carbonates as the polyisobutylene carrying tertiary halogen termini produced from such a process has a ratio of weight average molecular weight to number average molecular weight of no more than about 1.4.

In all of the aforementioned processes for the synthesis of the tertiary halogen terminated polyisobutylene the structure of the tertiary halogen terminated polyisobutylene is directly dependent upon the number of functional sites originally carried by the initiator; a monofunctional initiator giving rise to a linear terminally monofunctional polyisobutylene, a difunctional initiator giving rise to a linear terminally difunctional polyisobutylene and a trifunctional initiator giving rise to a branched polyisobutylene that is terminally trifunctional. If as the functionalities of the initiator are identical, the initiator and resulting terminally functional polyisobutylene are symmetrical.

For the preparation of the polyisobutylene having from 1 to 3 terminal allylic halogens of the present invention, synthesis of the base tertiary halogen terminated polyisobutylene may be accomplished by any of the aforementioned processes. Preferably the tertiary halogen terminated polyisobutylene is synthesized by the use of the initiating system comprising an organic peroxy compound initiator in conjunction with a Lewis acid. More preferably the synthesis is accomplished by the use of the initiating system comprising an organic peroxy compound selected from the group consisting of t-butyl hydroperoxide, cumene hydroperoxide, p-dicumyl hydroperoxide, triphenyl methyl hydroperoxide, 1,3,5-tris[α-(tertbutylperoxy)isopropyl] benzene and 2,5-dimethyl-2,5bis(benzoylperoxy hexane) in conjunction with titanium tetrachloride. In order that the polyisobutylene block of the block copolymer of the present invention have a relatively narrow molecular weight distribution of about or below 1.6, it is important that the base tertiary halogen terminated polyisobutylene which is converted in a two step sequence to the polyisobutylene having from 1 to 3 terminal allylic halogens which in turn undergoes reaction with living polymers to afford the aforesaid block copolymers have a relatively narrow molecular weight distribution of about or below 1.6. Consequently, when the base tertiary chlorine terminated polyisobutylene is synthesized by isobutylene polymerization using an initiating system comprising either an organic peroxide or organic hydroperoxide in conjunction with titanium tetrachloride it is preferable that an electron donor selected from one of dimethyl sulfoxide and diethylene glycol dimethyl ether (diglyme) also be used in the process.

The number average molecular weight $M_n$ of the tertiary chlorine terminated polyisobutylene produced in the process may be from as low as about 500 to as high as 500,000 or more, the molecular weight being controlled by the ratio of the initial monomer concentration to the initial peroxy compound concentration. Thus the polyisobutylene having from 1 to 3 terminal allylic halogens which is obtained in a two step reaction sequence from this base tertiary chlorine terminated polyisobutylene may also have a number average molecular weight of from about 500 to about 500,000 as no chain scission has been found to occur during either the dehydrochlorination reaction or the halogenation reaction. Preferably the number average molecular weight of the base tertiary chlorine terminated polyisobutylene and thus the number average molecular weight of the polyisobutylene having from 1 to 3 terminal allylic halogens is from about 750 to about 150,000.

When the polyisobutylene having from 1 to 3 terminal allylic halogens is to be used in the process of the present invention for the production of block copolymers of polyisobutylene and polymers of anionically polymerizable monomers it is preferable that the number average molecular weight of the polyisobutylene be from about 4,000 to about 60,000. For if the molecular weight of the polyisobutylene having from 1 to 3 terminal allylic halogens is any less than about 4,000 the resultant block copolymer formed with polymers of anionically polymerizable monomers are not effective as compatibilizers and if the molecular weight of the polyisobutylene having from 1 to 3 terminal allylic halogens is greater than about 60,000 then the coupling reaction with polymers of anionically polymerizable monomers to afford block copolymers is not a high yield reaction. Consequently, the base tertiary halogen terminated polyisobutylene from which the polyisobutylene having from 1 to 3 terminal allylic halogens is prepared should have a number average molecular weight of from about 4,000 to about 60,000. It is more preferable that the number average molecular weight of the base tertiary halogen terminated polyisobutylene and thus that of the polyisobutylene having the 1 to 3 terminal allylic halogens should be from about 7,500 to about 40,000.

The basic reaction for conversion of the tertiary halogen terminated polyisobutylene to a polyisobutylene with terminal unsaturation is one of dehydrohalogenation and this may be accomplished by two different procedures.

In one method the tertiary halogen terminated polyisobutylene prepared by any of the aforementioned processes is dissolved in a suitable inert organic solvent which may be a saturated aliphatic hydrocarbon such as hexane or heptane; an aromatic hydrocarbon such as toluene or mixed xylenes; an alicyclic hydrocarbon such as cyclohexane or methyl cyclohexane; or a cyclic ether such as tetrahydrofuran and the like to afford a 2 to 15 weight percent solution. To this polymer solution there is added from about 3 to about 10 moles of potassium tertiary butoxide per mole of tertiary halogen functionality of said tertiary halogen terminated polyisobutylene and the reaction mixture is heated under reflux for about 2 to about 24 hours to afford exclusively isopropylidene terminated polyisobutylene. Evidence for the formation of this product is afforded by a 200 $MH_z\ ^1H$ NMR spectrum which exhibits two singlets at 4.65 ppm and 4.85 ppm respectively due to the two protons attached to the olefinic carbon atom. Preferably the solvent of choice for the foregoing method of dehydrohalogenation is a nonpolar solvent such as a saturated aliphatic hydrocarbon or an alicyclic hydrocarbon as it has been found that by using such a solvent complete dehydrohalogenation may be effected within about 2 to about 6 hours. Recovery of the isopropylidene terminated polyisobutylene from a polar solvent such as tetrahydrofuran is accomplished by removal of the polar solvent under reduced pressure followed by dissolution of the polymer in a nonpolar organic liquid such as hexane or cyclohexane, repeated washings of the polymer solution with distilled water and ultimately separation by conventional means, namely filtration, evaporation of the solvent and drying under vacuum. In recovering the isopropylidene terminated polyisobutylene from a nonpolar solvent it is, of course, not necessary to remove the nonpolar organic liquid prior to washing with distilled water.

The tertiary halogen terminated polyisobutylene may also be dehydrohalogenated by heating at a temperature of from about 150° to about 220° C. for about 5 to about 15 hours. Using this procedure a mixture of both isobutylidene terminated polyisobutylene and isopropylidene terminated polyisobutylene is formed in a ratio of from about 45:55 to about 15:85. Evidence for the formation of this mixture of products is afforded by a 200 $MH_z\ ^1H$ NMR spectrum which exhibits two singlets at 4.65 ppm and 4.85 ppm respectively due to the two olefinic protons on the one carbon atom in the isopropylidene group ($-C(CH_3)=CH_2$) and the one singlet at 5.15 ppm which is due to the one olefinic proton in the isobutylidene group ($-CH=C(CH_3)_2$).

In neither of the aforementioned processes for the dehydrohalogenation of the tertiary halogen terminated polyisobutylene has any chain scission been observed and thus the number average molecular weights of the resultant isopropylidene and isobutylidene terminated polyisobutylenes are of the same order as the number average molecular weight of the parent tertiary halogen terminated polyisobutylene.

The polyisobutylene having from 1 to 3 terminal allylic halogens as contemplated by the present invention may be synthesized by the halogenation of either of the products of the aforementioned dehydrohalogenation processes; that is halogenation of either the isopropylidene terminated polyisobutylene alone or halogenation of the mixture of the isopropylidene and the isobutylidene terminated polyisobutylenes.

Suitable chlorinating agents include molecular chlorine or an organic chlorine compound of which representative nonlimiting examples include N-chlorosuccinimide, 1,3-dichloro-5,5-dimethylhydantoin and N-chloro-N-cyclohexylbenzene sulphonamide; 1,3-dichloro-5,5-dimethylhydantoin being the preferred organic chlorine compound.

Suitable brominating agents include organic bromine compounds of which representative non limiting examples include N-bromosuccinimide, 1,3-dibromo-5,5-dimethylhydantoin and N-bromocaprolactam, the preferred organic bromine compound being 1,3-dibromo-5,5dimethylhydantoin.

The preferred method for preparing the allylic chlorine terminated polyisobutylene of the present invention involves dissolution of the polyisobutylene with terminal unsaturation in a suitable inert solvent which may be a saturated aliphatic hydrocarbon such as hexane or heptane; an aromatic hydrocarbon such as toluene or mixed xylenes; an alicyclic hydrocarbon such as cyclohexane or methyl cyclohexane; or halogenated derivatives of the above hydrocarbons such as chloroform, carbon tetrachloride and the like to afford a 3 to 15 weight percent solution. There may also be dispersed about 10 percent by volume of water in this polymer solution to facilitate the removal of the hydrogen chloride generated during the chlorination of the base polyisobutylene with terminal unsaturation. To this polymer solution there is added with agitation molecular chlorine, preferably dissolved in a suitable solvent such as chloroform or carbon tetrachloride, in a quantity sufficient to achieve the desired level of chlorination. A polyisobutylene which has one terminal unsaturation (either the isopropylidene functionality or a mixture of both the isopropylidene and isobutylidene functionalities) requires one mole equivalent of molecular chlorine, a polyisobutylene which has two terminal unsaturations requires two mole equivalents of molecular chlorine and a branched polyisobutylene which has three terminal unsaturations requires three mole equivalents of molecular chlorine. Preferably the reaction is carried out in the absence or near absence of light. The chlorination reaction can be conducted at a temperature ranging from about 0° to about 50° C., preferably from about 15° to about 35° C. After a reaction time of about 2 to about 15 minutes, a solution of an alkaline reagent, preferably either an aqueous sodium hydroxide solution of about 10 weight percent or an aqueous potassium hydroxide solution of about 10 weight percent, is added to the polymer solution to neutralize the excess chlorine and the hydrogen chloride formed during the chlorination reaction. After about 10 minutes the polymer solution is washed thoroughly with water to remove the inorganic salts and the polymer is recovered by evaporation of the solvent and drying under vacuum. The allylic chlorine terminated polyisobutylene may also be recovered by coagulation with an excess of an organic liquid in which the polymer is sparingly soluble, examples of such a liquid being methanol, isopropanol or acetone.

Halogenation of the base isopropylidene terminated polyisobutylene or the base mixture of the isopropylidene terminated and the isobutylidene terminated polyisobutylenes may also be accomplished by reaction of the base polyisobutylenes with an organic halogenating reagent; halogenation in this context being chlorination or bromination. A quantity of the organic halogenating reagent sufficient to achieve the desired level of halogenation is added to a solution of the base polyisobutylene in an appropriate inert organic solvent, preferably dichloromethane, chloroform or carbon tetrachloride. The reaction may be carried out at a temperature of about 15° C. to about 35° C., or, alternatively in the presence of a free radical initiator such as an organic peroxide, at a more elevated temperature of about 50° C. to about 90° C. The reaction period may extend from about 10 minutes to about 2 hours when the reaction is carried out either in the absence or in the presence of a free radical initiator. Isolation of the allylic halogen terminated polyisobutylene thus produced is accomplished as hereinbefore described.

Halogenation of the base isopropylidene terminated polyisobutylene or the base mixture of the isopropylidene terminated and the isobutylidene terminated polyisobutylenes by either of the aforementioned processes gives rise to a polyisobutylene having from 1 to 3 terminal allylic halogens and having a number average molecular weight of the same order as the terminally unsaturated polyisobutylenes and thus of the same order as the number average molecular weight of the parent tertiary halogen terminated polyisobutylene.

While not wishing to be bound by any theories it is believed that chlorination by molecular chlorine or chlorination or bromination by an organic chlorine or organic bromine compound in the absence of a free radical initiator of the base terminally unsaturated polyisobutylenes occurs by a predominantly ionic mechanism wherein a positively charged chlorine or bromine atom is added to the double bond and a proton is subsequently abstracted by a negatively charged species which is a chlorine anion where the chlorinating agent is molecular chlorine and is a negatively charged organic chlorine species or organic bromine species when the chlorinating or brominating agent is an organic chlorine compound or an organic bromine compound. This results in a shift in the double bond with the chlorine or bromine substituted in the allylic position thereby giving rise to the polyisobutylene having from 1 to 3 terminal allylic chlorines or bromines of the present invention.

Evidence for the formation of the allylic chlorine or allylic bromine terminated polyisobutylene of the present invention is afforded by NMR spectroscopy. The 200 MH$_z$ $^1$H NMR spectrum of the product obtained upon molecular chlorination of a difunctional isopropylidene terminated polyisobutylene exhibits two singlets at 4.95 ppm and 5.25 ppm attributable to the two olefinic protons —CH$_2$—C(CH$_2$Cl)=CH$_2$ and a singlet at 4.05 ppm attributable to the methylene protons attached to the same carbon as the chlorine —CH$_2$—C(CH$_2$Cl)=CH$_2$. The 200 MH$_z$ $^1$H NMR spectrum of the product obtained upon molecular chlorination of a 60:40 mixture of isopropylidene terminated polyisobutylene and isobutylidene terminated polyisobutylene exhibits four singlets in the ratio of 6:2:7:3 at 4.05 ppm, 4.20 ppm, 4.95 ppm and 5.25 ppm attributable to the two olefinic protons —CH$_2$—C(CH$_2$Cl)=CH$_2$ and the methylene protons attached to the same carbon as the chlorine —CH$_2$—C(CH$_2$Cl)=CH$_2$ in the 2 chloromethyl-2-propenyl terminated polyisobutylene and the two olefinic protons —CHCl—C(CH$_3$)=CH$_2$ and the methine proton attached to the same carbon as the chlorine —CHCl—C(CH$_3$)=CH$_2$ in the 1-chloro-2-methyl-2-propenyl terminated polyisobutylene. The 200 MH$_z$ $^1$H NMR spectrum of the product obtained upon bromination of a difunctional isopropylidene terminated polyisobutylene with 1,3-dibromo-5,5-dimethylhydantoin exhibits three singlets at 4.0 ppm, 4.95 ppm and 5.30 ppm attributable to the two olefinic protons —CH$_2$—C(CH$_2$Br)=CH$_2$ and the methylene protons attached to the same carbon as the bromine —CH$_2$—C(CH$_2$Br)=CH$_2$.

The production of linear block and three arm star block copolymers of polyisobutylene and polymers of anionically polymerizable monomers of the present invention is accomplished by reaction of the aforementioned polyisobutylene having from 1 to 3 terminal halogens with living polymers prepared by anionic polymerization of a monomer selected from the group consisting of conjugated diolefins, vinyl aromatic monomers, acrylates and mixtures thereof. Preferably the polyisobutylene having from 1 to 3 terminal halogens that is used in the reaction with the living polymers of anionically polymerizable monomers is a polyisobutylene having from 1 to 3 terminal allylic chlorines.

The living polymers can be produced utilizing techniques that are well known to persons skilled in the art. The initiator used in initiating the polymerization of the anionically polymerizable monomers may be selected from the group of metals consisting of barium, lithium, magnesium, sodium and potassium; lithium and magnesium being the metals most commonly utilized. Organolithium compounds, however, are the preferred initiators for use in such polymerizations and can be represented by the formula R—Li, wherein R represents a hydrocarbyl radical containing from 1 to about 20 carbon atoms, preferably from 1 to about 10. Some representative examples of preferred organolithium compounds include methyllithium, ethyllithium, isopropyllithium, n-butyllithium, sec-butyllithium, n-hexyllithium, n-octyllithium, phenyllithium, 1-naphthyllithium and p-tolyllithium; sec-butyllithium being highly preferred as an initiator.

The amount of organolithium initiator used will vary depending upon the molecular weight desired for the polymer being synthesized as well as the polymerization temperature which is to be used. The precise amount of organolithium compound required to produce a polymer of a desired molecular weight can be easily ascertained by persons skilled in the art. However, as a general rule from about 0.1 to about 2 parts by weight per 100 parts by weight of monomers of an organolithium initiator will be used to prepare a living polymer for use in the process of the present invention.

The living polymers used in the practice of this invention for reacting with a polyisobutylene having from 1 to 3 terminal allylic halogens should have number average molecular weights within the range of about 4,000 to about 60,000. It is highly preferred for such polymers to have number average molecular weights within the range of about 7,500 to about 40,000. For if the number average molecular weight of the living polymer formed from an anionically polymerized monomer of mixture of monomers is less than about 4,000 the resultant block copolymer produced upon reaction with a polyisobutylene having from 1 to 3 terminal allylic halogens will not be an effective compatibilizer and if the number average molecular weight of the living polymer is greater than about 60,000 the reaction with the allylic halogen terminated polyisobutylene will not be a highly efficient process.

Depending on the type of monomer, elastomeric or thermoplastic living polymers may be produced by the anionic polymerization of unsaturated monomers using the aforementioned organometallic catalysts. Elastomeric or rubbery polymers can be obtained by the polymerization of diene monomers using the organometallic catalyst system. The diene monomers that can be polymerized in this manner may be conjugated diolefins; conjugated diolefins containing from 4 to 8 carbon atoms being generally preferred. Representative nonlimiting examples of conjugated diolefins that may be anionically polymerized using an organolithium compound include 1,3-butadiene, isoprene, 1,3-pentadiene, 2,3-dimethyl-1,3-butadiene, 2-methyl-1,3-pentadiene and 2,3-dimethyl-1,3-pentadiene. Vinyl substituted aromatic monomers may also be copolymerized with one or more of the conjugated diolefins to afford rubbery random or block copolymers, vinyl substituted aromatic monomers having from about 8 to about 20 carbon atoms being preferred. Representative nonlimiting examples of such vinyl substituted aromatic monomers that can be utilized include styrene, α-methyl styrene, various alkyl styrenes, p-methoxystyrene, 1-vinylnaphthalene, 4-vinyl toluene and the like. Preferably the monomer or mixture of monomers that may be anionically polymerized using an organolithium compound is selected from the group consisting of butadiene, isoprene, styrene and mixtures thereof. More preferably the monomer that is anionically polymerized is butadiene.

The living metal terminated rubbery homopolymers or copolymers are prepared by solution polymerization using inert organic solvents such as aliphatic hydrocarbons, alicyclic hydrocarbons and aromatic hydrocarbons. The solvents used in such solution polymerizations will normally contain from about 4 to about 10 carbon atoms per molecule and will be liquids under the conditions of the polymerization. Some representative examples of suitable organic solvents include pentane, n-hexane, heptane, cyclohexane, methylcyclohexane, benzene, toluene, ethylbenzene, xylene and the like, alone or in admixture. Preferably the organic solvent is selected from hexane, heptane, cyclohexane, methyl cyclohexane and mixtures thereof.

The vinyl content in the conjugated diolefin portion of the polymer chain may be controlled by the use of a microstructure controlling agent such as an ether or a tertiary amine. Representative nonlimiting examples of ethers that may be used as microstructure controlling agents include dioxane, tetrahydrofuran and derivatives thereof, ethylene glycol dimethyl ether, ethylene glycol diethyl ether, diethylene glycol dimethyl ether, triethylene glycol dimethyl ether and derivatives thereof or the like. Representative nonlimiting examples of tertiary amines include triethylamine, $N,N,N^1N^1$-tetramethyl ethylene diamine and the like. The amount of the microstructure controlling agent used varies depending upon the microstructure of the objective conjugated diolefin polymer or conjugated diolefin-vinyl substituted aromatic monomer copolymer, and it is in the range of from about 0.05 to 2,000 moles, preferably from about 0.2 to 1,000 moles per mole of organometallic catalyst.

The polymerization process can be carried out at any temperature within the range of about $-80°$ C. to about $150°$ C. but preferably the polymerization process is carried out at a temperature of about $-20°$ C. to about $80°$ C.

The aforementioned vinyl substituted aromatic monomers may also be polymerized alone under the aforementioned experimental conditions to afford thermoplastic living polymers which may then be used in the process of the present invention for reacting with a polyisobutylene carrying from 1 to 3 terminal allylic halogens.

Depending on the nature of the acrylate monomer, living polymers having elastomeric or thermoplastic properties may be produced by the anionic polymerization of acrylate monomers using an organometallic catalyst. Representative non limiting examples of acrylate monomers that may be polymerized include methyl acrylate, methyl methacrylate, ethyl acrylate, ethyl methacrylate, isopropyl methacrylate, butyl acrylate, butyl methacrylate and t-butyl methacrylate.

Preferably the monomer that is anionically polymerized using an organometallic catalyst is at least one $C_1$ to $C_2$ alkyl ester of a $C_3$ to $C_6$ ethylenically unsaturated ester. More preferably the monomer is selected from the group consisting of methyl methacrylate, methyl acrylate, ethyl methacrylate, ethyl acrylate and mixtures thereof.

Representative nonlimiting examples of organometallic catalysts that may be used in the living anionic polymerization of the acrylate monomers include (1-phenyl-1-methylhexyl) lithium, (1,2-dimethyl pentyl) lithium, (1,1-diphenyl hexyl) lithium and (1,1-diphenyl3-methyl pentyl) lithium.

The living metal terminated acrylate homopolymers are prepared by solution polymerization in inert organic solvents such as aromatic hydrocarbons, cyclic ethers, cyclic amines and mixtures thereof. Some representative examples of suitable organic solvents include toluene, ethyl benzene, xylene, tetrahydrofuran, dioxane, pyridine, piperidine and the like, alone or in admixture.

Control of the rate of polymerization and the prevention of the occurrence of secondary reactions may be accomplished by the use of lithium salts such as lithium fluoride, lithium chloride, lithium bromide and lithium tetraphenyl borate in the reaction medium. The amount of the lithium salt used is in the range of from about 0.5 to 20 moles per mole of organolithium compound.

The temperature at which the polymerization process is carried out is within the range of about $-90°$ C. to about $-30°$ C.

The process of the present invention for the preparation of the linear block or three arm star block copolymers of polyisobutylene and polymers of anionically polymerizable monomers is a solution process. Preparatory to reaction with the alkali metal terminated living polymer, the polyisobutylene having from 1 to 3 terminal allylic halogens is preferably purified by repeated dissolution in a suitable dry inert organic solvent such as hexane and coagulation with an excess of a solvent such as methanol in order that any impurities from the halogenation procedure present in the polymer are removed and thus will not contribute to the destruction of the alkali metal terminated living polymer. The polyisobutylene having from 1 to 3 terminal allylic halogens is dissolved in a suitable inert organic solvent which may be a saturated aliphatic hydrocarbon such as hexane or heptane; an aromatic hydrocarbon such as toluene or mixed xylenes; an alicyclic hydrocarbon such as cyclohexane, a cyclic ether such as tetrahydrofuran, dioxane and the like; and mixtures thereof, to afford a solution of about 1 to about 10 parts by weight of said polyisobutylene per 100 parts by weight of volume of inert organic solvent, to which a positive pressure of an inert gas such as argon, nitrogen or the like may subsequently be applied. Preferably the inert organic solvent is selected from hexane, heptane, cyclohexane, methylcyclohexane, tetrahydrofuran, dioxane and mixtures thereof.

To this solution of polyisobutylene having from 1 to 3 terminal allylic halogens there is added with agitation a solution of the alkali metal terminated living polymer in an inert organic solvent compatible with said polyisobutylene solution, the concentration of said alkali metal terminated living polymer in said inert organic solvent being of from about 1 to about 15 parts by weight per 100 parts by weight of inert organic solvent. The alkali metal terminated living polymer is conveniently used in the form in which it is prepared; that is the solution of the alkali metal terminated living polymer of the desired molecular weight and concentration to be used in the process is that obtained upon the anionic polymerization of the unsaturated monomer or mixture of monomers in an inert organic solvent using an organometallic catalyst. The molar amount of alkali metal terminated living polymer needed for the formation of the linear block or three arm star block copolymers is determined by the structure of the allylic halogen terminated polyisobutylene, a polyisobutylene having one terminal allylic halogen requiring one mole equivalent of the alkali metal terminated living polymer, a polyisobutylene carrying two terminal allylic halogens requiring two mole equivalents of the alkali metal terminated living polymer and a polyisobutylene having three terminal allylic halogens requiring three mole equivalent of the alkali metal terminated living polymer.

This solution obtained upon addition of the solution of the alkali metal terminated living polymer to the solution of the allylic halogen terminated polyisobutylene is then agitated for about 30 minutes to about 24 hours at a temperature of from about 10° C. to about 80° C. to ensure that reaction of the two polymeric systems occurs to the fullest extent.

The efficiency of the reaction is not only influenced by the period for which the reaction is carried out and the temperature at which the reaction is carried out but also by the concentrations of the polymers in the solution and the number average molecular weights of the polymers, and, in particular, the number average molecular weight of the alkali metal terminated living polymer. Thus in order to ensure as complete a reaction as possible of the allylic halogen moiety with the alkali metal terminated living polymer, it is preferred that when the number average molecular weight of the alkali metal terminated living polymer is of the order of 7,500 or greater, that the amount of the allylic halogen terminated polyisobutylene in the inert organic solvent is from about 2 to about 6 parts by weight per 100 parts by weight of inert organic solvent and the amount of the metal terminated living polymer is from about 2 to about 6 parts by weight per 100 parts by weight of inert organic solvent. For it has been found that when more concentrated solutions are utilized and the number average molecular weight of the alkali metal terminated living polymer is of the order of 7,500 or more, there is the tendency for quantitative reaction not to occur. For example, when the polyisobutylene has two terminal allylic halogens, diblock copolymers are formed in addition to the desired triblock copolymer. The use of dilute solutions does not eliminate this problem when the number average molecular weight of the metal terminated living polymer is 7,500 or more but does reduce it somewhat.

On completion of the reaction suitable stabilizers and antioxidants are added to the block copolymer. Examples of suitable stabilizers include calcium stearate and epoxidized soyabean oil, preferably used in the amount of about 0.05 to 5 parts by weight per 100 parts by weight of the block copolymer. Suitable antioxidants include sterically hindered phenols, preferably used in the amount of about 0.05 to 2 parts by weight per 100 parts by weight of the block copolymer.

Recovery of the linear block or three arm star block copolymers produced in the process disclosed herein is achieved by conventional techniques used to recover polymers including (i) contacting the polymer solution with steam thereby flashing off the solvent (ii) passing the wet polymer over a screen or filter in order to recover the polymer and (iii) passing the polymer through a tunnel dryer or extruder. The block copolymer may also be recovered by coagulation with an excess of an organic liquid in which the block copolymer is sparingly soluble, examples of such a liquid being methanol, isopropanol or acetone.

The following examples illustrate the present invention and are not intended to limit the scope thereof. All parts are parts by weight unless otherwise specified.

EXAMPLE 1

A polyisobutylene having two terminal allylic chlorines was prepared by the following three step synthetic procedure.

A two-necked 2000 ml round bottom flask equipped with a mechanical stirrer and rubber septum was charged with 500 ml of methyl chloride, 345 ml of n-hexane and $2.16 \times 10^{-3}$ mole of 2,5-dimethyl-2,5-bis(-benzoyl peroxyhexane) (LUPEROX ® 118) After cooling to $-80°$ C., 1.0 mole of prechilled isobutylene was added, followed by $3.24 \times 10^{-2}$ mole of titanium tetrachloride. The polymerization thus initiated was allowed to proceed to completion. The resultant polymer was recovered by successive evaporation of the volatiles, dissolution in n-hexane, decantation or filtration of inorganic residues such as Lewis acid residues and removal of hexane by evaporation at room temperature. The resultant polymer a difunctional tertiary chlorine terminated polyisobutylene was characterized by gel permeation chromatography and shown to have an $M_n$ of 24,000 and an $M_w/M_n$ of 1.08.

A 2-necked 1000 ml round bottom flask equipped with a mechanical stirrer was charged with the aforementioned difunctional tertiary chlorine terminated polyisobutylene (30 gm) dissolved in dry tetrahydrofuran (600 ml). Potassium t-butoxide (1.40 gm, $1.25 \times 10^{-2}$ moles was added to this solution, a positive pressure of nitrogen was applied and the reaction mixture was heated under reflux with agitation for 16 hours. After the reaction mixture had cooled to room temperature, it was filtered to remove the residual potassium t-butoxide and the filtrate was then concentrated under reduced pressure. The residual polymer was dissolved in hexane and the resultant organic solution was washed three or four times with water, and then dried over anhydrous magnesium sulphate. Concentration of the organic solution under reduced pressure afforded exclusively the isopropylidene terminated polyisobutylene as evidenced by a 200 $MH_z$ $^1H$ NMR spectrum which exhibited two singlets at 4.65 ppm and 4.85 ppm respectively due to the two protons attached to the olefinic carbon atom.

A 2-necked 750 ml round bottom flask equipped with a mechanical stirrer was charged with the aforementioned difunctional isopropylidene terminated polyisobutylene (25 g) dissolved in carbon tetrachloride (500 ml). To this cement was added 50 ml of water and the resultant mixture was stirred vigorously for 10 minutes to ensure complete dispersion of the water in the cement. The flask was wrapped with aluminum foil in order to exclude ambient light and then a solution of molecular chlorine in carbon tetrachloride (2.1 ml) of a known concentration (7 gm molecular chlorine per 100 ml carbon tetrachloride) was added to the polymer solution with vigorous agitation. After two minutes 1.0 ml of an aqueous sodium hydroxide solution of 10 weight percent was added dropwise to neutralize any excess molecular chlorine and the hydrochloric acid formed during the reaction. The organic layer was separated, washed three or four times with water and then dried over anhydrous magnesium sulphate. Concentration under reduced pressure of the organic solution afforded the difunctional allylic chlorine terminated polyisobutylene which was subsequently dried in a vacuum oven at a temperature of from about 30° C. to about 40° C. for 2 days.

Evidence for the formation of the allylic chlorine, terminated polyisobutylene was afforded by a 200 $MH_z$ $^1H$ NMR spectrum which exhibited two singlets at 4.95 ppm and 5.25 ppm attributable to the two olefinic protons —$CH_2$—C ($CH_2Cl$)=$CH_2$ and a singlet at 4.05 ppm attributable to the methylene protons attached to the same carbon as the chlorine (—$CH_2$—C($CH_2$Cl)=$CH_2$).

In this manner a polyisobutylene having from 1 to 3 allylic chlorines may be synthesized by varying the functionality of the initiator used in the initial polymerization of isobutylene to a tertiary chlorine terminated polyisobutylene.

EXAMPLE 2

Dehydrohalogenation of a difunctional tertiary chlorine terminated polyisobutylene (25 g, $M_n$ 20,000) was also accomplished by heating the polymer at a temperature of 180° C. for 16 hours in a vacuum oven, a 70:30 mixture of isopropylidene terminated polyisobutylene and isobutylidene terminated polyisobutylene being obtained. Evidence for the formation of this mixture of products was afforded by a 200 $MH_z$ $^1H$ NMR spectrum which exhibited two singlets at 4.65 ppm and 4.85 ppm respectively due to the two olefinic protons on the one carbon atom in the isopropylidene group (—C($CH_3$)=$CH_2$) and the one singlet at 5.15 ppm due to the one olefinic proton in the isobutylidene group (—CH=C($CH_3$)$_2$.

EXAMPLE 3

Synthesis of a polyisobutylene having two terminal allylic bromines was accomplished using the following procedure.

A solution of a difunctional isopropylidene terminated polyisobutylene (5g, Mn 20,000) in dry n-hexane (95 ml) was placed in a 200 ml bottle equipped with a screw cap. To this solution was added a solution of 1,3-dibromo-5,5-dimethyl hydantoin (0.286 gm, $1 \times 10^{-3}$ moles) in dichloromethane (10 ml) and the mixture was shaken for 15 minutes, after which time water (10 ml) was added and the mixture shaken for a further 15 minutes. The aqueous phase was separated and the majority of the organic solvent was then removed under reduced pressure, the brominated polymer was being recovered by coagulation with methanol and drying in a vacuum oven at a temperature of 50° C. for 24 hours.

Evidence for the formation of the allylic bromine terminated polyisobutylene was afforded by a 200 $MH_z$ $^1H$ NMR spectrum which exhibited three singlets at 4.0 ppm, 4.95 ppm and 5.30 ppm attributable to the methylene protons attached to the same carbon as the bromine $CH_2$—C ($CH_2Br$)=$CH_2$ and to the two olefinic protons —$CH_2$—C($CH_2Br$)=$CH_2$.

EXAMPLE 4

A linear polybutadiene-polyisobutylene-polybutadiene triblock copolymer was prepared by the following procedure.

A polyisobutylene having two terminal allylic chlorines and having a number average molecular weight of 18,000 a peak molecular weight (Mp) of 18,500 was prepared according to the procedure outlined in Example 1. A sample of 20 gm of this polymer was then dissolved in dry cyclohexane (400 ml) and the solution contained in a 750 ml capped bottle under a positive pressure of nitrogen.

Lithium terminated polybutadiene was prepared under anhydrous and anaerobic conditions in a closed, glass reaction vessel. Butadiene (20 gm, 0.37 moles) dissolved in cyclohexane (500 ml) was charged to the reaction vessel together with a 1.6M solution of sec-butyllithium (0.75 ml). The reaction vessel was heated to 60° C. and the polymerization was contined for 6 hours. An aliquot of the solution of the living polybutadiene was then removed and quenched by the addition of an excess of methyl alcohol. Analysis by gel permeation chromatography of the polybutadiene thus obtained indicated that the polymer had a number average molecular weight of 32,000 and a peak molecular weight of 34,000.

The solution of the polyisobutylene having two terminal allylic chlorines in cyclohexane was then transferred to the reaction vessel containing the freshly prepared lithium terminated polybutadiene in cyclohexane and the mixture was stirred vigorously for 4 hours at a temperature of 50° C. The solution of the polymeric material was permitted to cool to ambient temperature and then 0.1 parts by weight of butylated hydroxy toluene per 100 parts by weight of the polymer was added as a stabilizer. The polymeric material was subsequently isolated by coagulation with an excess of methanol and dried under reduced pressure at a temperature of 40° C. for 2 days.

Analysis by gel permeation chromatography of the polymeric material thus obtained showed that there was a bimodal molecular weight distribution with at least 50 percent of the polymeric material having a peak molecular weight of 87,060 indicating that both of the terminal allylic chloride moieties born by the polyisobutylene had undergone reaction with the living polybutadiene to afford a polybutadiene-polyisobutylene-polybutadiene triblock copolymer. Less than 50 percent of the polymeric material was shown to have a peak molecular weight of 52,000 indicating that reaction of only one of the two terminal allylic chlorine moieties born by the polyisobutylene had occurred with the living polybutadiene to afford a polybutadiene-polyisobutylene diblock copolymer.

EXAMPLE 5

Using the procedure outlined in Example 4, five further linear block copolymers of polybutadiene and polyisobutylene in which the polybutadiene and polyisobutylene blocks had varying molecular weights were prepared and the results are given in the following table.

TABLE I

| Run No. | 1 | 2 | 3 | 4 | 5 |
|---|---|---|---|---|---|
| Diallylic chloride terminated PIB | | | | | |
| Mn | 24,500 | 24,500 | 19,200 | 18,000 | 27,500 |
| Mp | 26,000 | 26,000 | 20,000 | 18,180 | 30,000 |
| Lithiated PBd | | | | | |
| Mn | 24,200 | 19,000 | 10,100 | 23,000 | 36,300 |
| Mp | 25,990 | 20,750 | 10,750 | 24,200 | 38,250 |
| Mp of Triblock Copolymer | 76,470 | 65,000 | 40,540 | 62,800 | 104,110 |
| Mp of Diblock Copolymer | 52,400 | 47,950 | | 44,600 | 67,800 | where
Mn = number average molecular weight
Mp = peak molecular weight
PIB = polyisobutylene
PBd = polybutadiene An examination of the results provided in Table I reveals the effect that the number average molecular weight of the lithium terminated polybutadiene has on the efficiency of the reaction between the polyisobutylene having two terminal allylic chlorines and the lithiated polybutadiene. In each of Run Nos. 1, 2, 4 and 5 where the number average molecular weight of lithiated polybutadiene is of the order of 20,000 or greater, the gel permeation chromotographic results indicate that there is a bimodal distribution of polymeric material with both a polybutadiene-polyisobutylene-polybutadiene triblock copolymer and a polybutadiene-polyisobutylene diblock copolymer being formed. However, in Run No. 3 where the number average molecular weight of the lithiated polybutadiene is 10,100 a quantitative reaction with the polyisobutylene having two terminal allylic chlorines has occurred to afford only a polybutadiene-polysiobutylene-polybutadiene triblock copolymer.

EXAMPLE 6

Four pentablock copolymers each having a midblock of polyisobutylene and endblocks of polybutadiene-polystyrene block copolymers were prepared according to the procedure of Example 4 except that subsequent to the polymerization of the butadiene, styrene monomer in the amount of from about 3 to 8 by weight percent was added to the reaction mixture containing the living polybutadiene and the polymerization was continued for a further 2 hours prior to the coupling reaction with the difunctional allylic chlorine terminated polyisobutylene being carried out. The results are given in the following table.

TABLE II

| Run No. | 1 | 2 | 3 | 4 |
|---|---|---|---|---|
| Diallylic chloride terminated PIB | | | | |
| Mn | 18,000 | 18,000 | 18,700 | 18,700 |
| Mp | 20,500 | 20,500 | 21,510 | 21,510 |
| Lithiated PBd-PSt | | | | |
| Mn | 9,100 | 10,300 | 9,200 | 9,500 |
| Mp | 10,000 | 12,000 | 10,660 | 10,960 |
| Mp of Pentablock Copolymer | 41,000 | 43,950 | 41,610 | 41,630 | where
Mn = number average molecular weight
MP = peak molecular weight
PIB = polyisobutylene
PBd-PSt = polybutadiene-polystyrene block copolymer where
Mn=number average molecular weight
Mp=peak molecular weight
PIB=polyisobutylene
PBd-PSt=polybutadiene-polystyrene block copolymer Examination of the gel permeation chromatographic results presented in Table II reveals that in each of Run Nos. 1, 2, 3 and 4 reaction between the lithium terminated polybutadiene-polystyrene block copolymers having a number average molecular weight of the order of 10,000 and the polyisobutylene having two terminal allylic chlorines is essentially quantitative.

What is claimed is:
1. A polyisobutylene having from 1 to 3 terminal allylic halogens wherein said halogen is selected from the group consisting of chlorine and bromine and wherein the terminal allylic halogens are the only halogen groups contained in the polyisobutylene.
2. The polyisobutylene of claim 1 wherein said allylic halogen is chlorine.
3. The polyisobutylene of claim 1 having a number average molecular weight of from about 750 to about 150,000.
4. The polyisobutylene of claim 3 wherein said number average molecular weight is from about 4,000 to about 60,000.
5. A process for preparing a polyisobutylene having from 1 to 3 terminal allylic chlorines which comprises the steps of:
   i) forming a solution of a polyisobutylene having from 1 to 3 terminal unsaturations in an inert or- ganic solvent wherein there is dispersed from 0 to about 10 percent by volume of water per volume of inert organic solvent, ii) adding to said polyisobutylene solution molecular chlorine in a quantity sufficient to achieve the desired level of chlorination at a temperature of from about 0° C. to about 50° C. for a reaction time of from about 2 to about 15 minutes in the absence or near absence of light whereby said polyisobutylene having from 1 to 3 terminal unsaturations becomes chlorinated in the allylic position, iii) adding an alkaline solution to the solution from (ii) sufficient to neutralize the hydrogen chloride formed, and iv) recovering from the solution the polyisobutylene having from 1 to 3 terminal allylic chlorines.

6. The process of claim 5 wherein said molecular chlorine is dissolved in an organic solvent selected from chloroform and carbon tetrachloride.

7. The process of claim 6 wherein said temperature is from about 15° C. to about 35° C.

8. The process of claim 7 wherein said inert organic solvent is selected from the group consisting of $C_6$ to $C_7$ saturated aliphatic hydrocarbons, $C_7$ and $C_8$ aromatic hydrocarbons, $C_6$ and $C_7$ alicyclic hydrocarbons and $C_1$ halogenated hydrocarbons.

9. The process of claim 8 wherein said inert organic solvent is selected from the group consisting of hexane, cyclohexane, chloroform and carbon tetrachloride.

10. A process for preparing a polyisobutylene having from 1 to 3 terminal allylic halogens wherein said halogen is selected from the group consisting of chlorine and bromine which process comprises the steps of:

i) forming a solution of a polyisobutylene having from 1 to 3 terminal unsaturations in an inert organic solvent, ii) adding to said polyisobutylene solution a halogenating agent selected from the group of N-chloroamides and N-bromoamides in a quantity sufficient to achieve the desired level of halogenation, iii) subjecting the resulting solution to a temperature of from about 15° C. to about 35° C. in the absence or near absence of light, whereby said polyisobutylene having from 1 to 3 terminal unsaturations becomes halogenated in the allylic position, and iv) recovering from the solution the polyisobutylene having from 1 to 3 terminal allylic halogens wherein said halogen is selected from the group consisting of chlorine and bromine.

11. The process of claim 10 wherein said inert organic solvent is selected from the group consisting of dichloromethane, chloroform and carbon tetrachloride.

12. The process of claim 11 wherein said halogenating agent is selected from the group consisting of 1,3-dichloro-5,5-dimethylhydantoin and 1,3-dibromo-5,5-dimethylhydantoin.

* * * * *